Sept. 21, 1926. 1,600,834
O. MADER
SUPPORTING STRUCTURE FOR FLYING MACHINES
Filed June 30, 1922 2 Sheets-Sheet 1
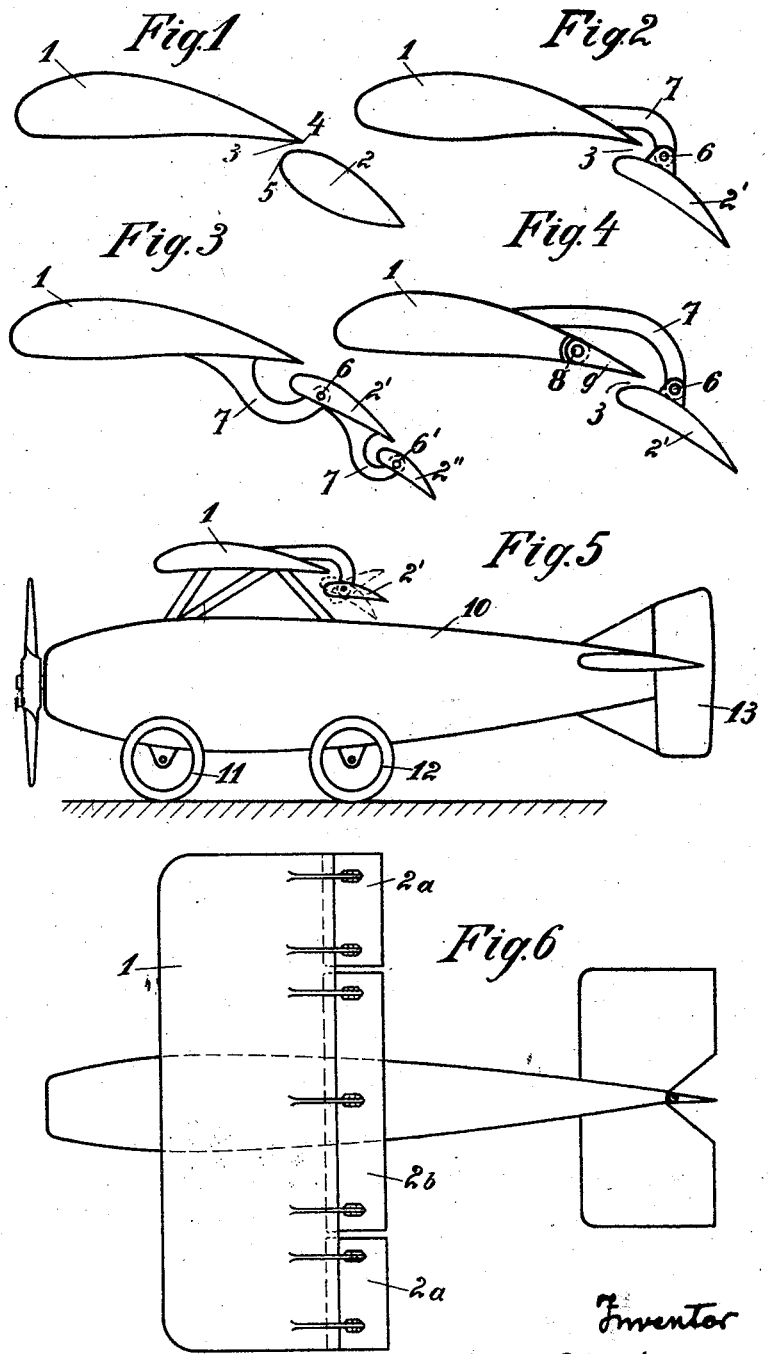

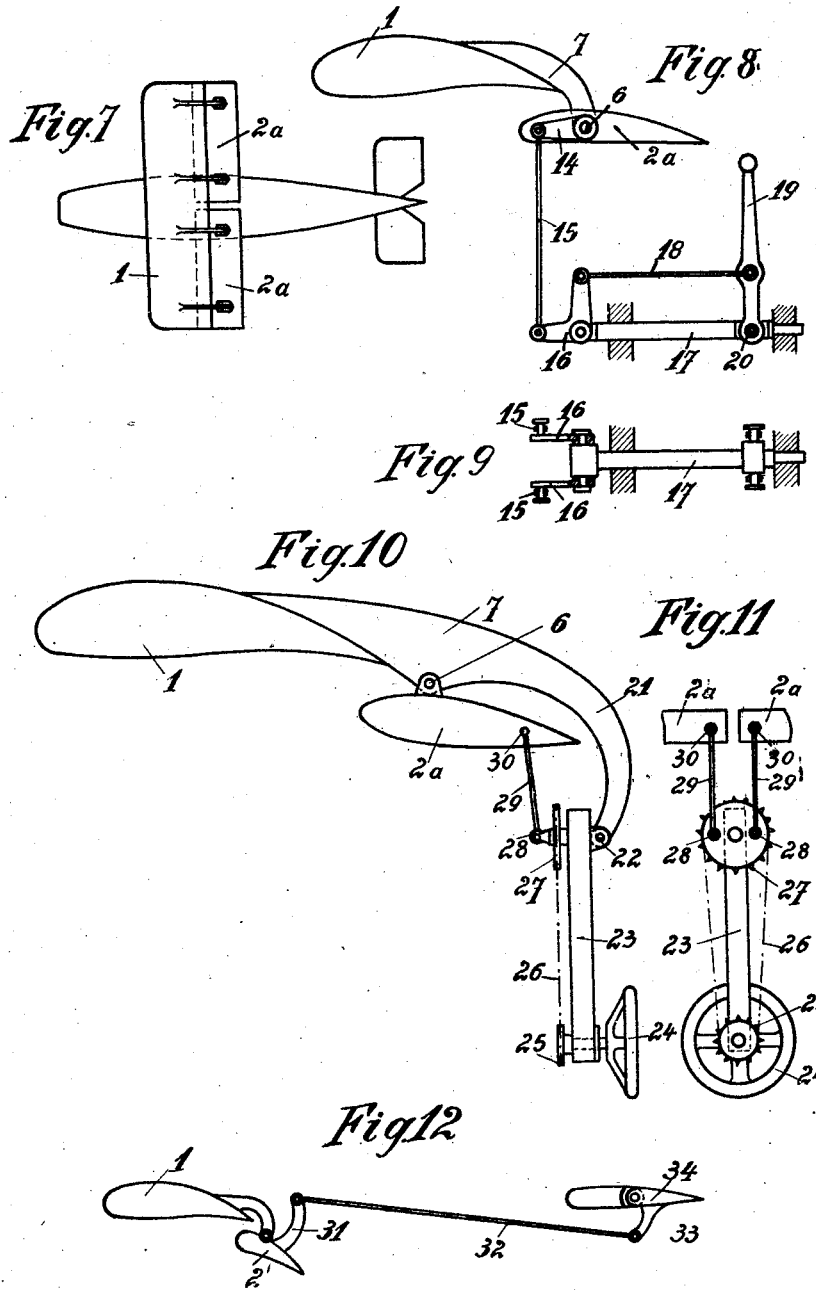

Patented Sept. 21, 1926.

1,600,834

UNITED STATES PATENT OFFICE.

OTTO MADER, OF DESSAU, GERMANY, ASSIGNOR TO HUGO JUNKERS, OF DESSAU, GERMANY.

SUPPORTING STRUCTURE FOR FLYING MACHINES.

Application filed June 30, 1922, Serial No. 572,104, and in Germany July 7, 1921.

My invention relates in general to a supporting structure consisting of, or having, a plurality of spaced supporting planes or wings; in particular the invention consists in arranging two or more supporting planes or wings, or supporting members of similar transverse section, especially such shaped according to stream-lines, in steps or in staggered relation in such a manner, that the rear edge of the first or foremost wing and, perhaps, also of the second, and, may be, of a third etc. wing, too, is positioned at a moderate distance above and to the rear of the front edge of the next-succeeding wing, there being formed in this way between two consecutive wings a rearwardly directed air passage which terminates above the second of the two wings concerned. Preferably that wing which is, of the two concerned, the foremost in the direction of flight, predominates in size so that the supporting structure is composed of a main wing and one or more auxiliary wings which succeed on that main wing in the direction of flight. The width of the air passage provided between two consecutive wings is, as regards the conditions existing at normal flying, but small in proportion to the length of the supporting structure, viz in the longitudinal direction of the machine; it amounts at the highest to about 50–30% or even less of the depth of the small wing.

The aerodynamic conditions obtained with this novel arrangement are materially improved in that air is conducted from the lower surface of the main wing to the upper surface of the auxiliary wing through the passage or channel between them which acts similarly to a nozzle. Owing to this supply of air the conditions of flow of the air at the upper wing surface are improved and the formation of eddies is diminished in this place. If there are more than one auxiliary wing, the co-operation of the first with the second, and so on, is the same as of the main wing with the first auxiliary one.

This improvement of the conditions of the flow of air as brought about by the novel wing arrangement, entails a remarkable augmentation of the raising force or buoyancy, without an excessive increase of the noxious resistance.

The novel supporting wing arrangement thus offers the great advantage that a flying machine intended to carry a certain total load may, from the beginning, be equipped with a materially smaller supporting surface than the usual arrangement requires. The manufacturing costs are, therefore, considerably reduced, and the machine may be more easily manipulated and steered. Besides, the smaller supporting planes or wings are subjected to a smaller bending stress in consequence of the smaller bending moment, and they may, thus, be of a lighter construction.

Another important improvement consists in the feature that the auxiliary wing, or wings, is, or are, movable about a joint, or joints, extending transversely to the direction of flight. If there are more than one auxiliary wing, either the two or more wings may be singly adjustable with respect to the main wing, or they may all be adjusted at a time, or both possibilities may be provided for.

I am aware of the fact that the main supporting plane or wing has already been combined with a special oscillatory auxiliary wing, or a plurality of such (the so-called vertical rudders), but this wing, or those wings, served solely for steering purposes, not to increase the buoyancy.

If the auxiliary wing is, or the auxiliary wings are, jointed to its, or their, supporting members it is very advantageous to shape all wings, i. e. the main wing and the auxiliary one or ones, in conformity with regular supporting plane profiles, because then a particularly good flowing off of the air with respect to the various positions of the wings may be obtained.

The novel wing arrangement with its adjustable auxiliary wings acts similarly to a supporting plane with variable arching, but its practical realization is attended with some more advantages. It is true that the buoying capacity of such a supporting plane may be increased by making the vault higher, but then the drawback is obtained that this strongly vaulted plane offers a comparatively great resistance which renders starting difficult and is disadvantageous also in regard to the economy of the flying machine.

With the novel arrangement the combination of the adjustibility of certain members of the suporting structure with the slot-effect produces the further effect that high maximum buoyancy values are attained, but in the normal flying position the resistance is not materially more unfavorable than with a single supporting plane.

If movable auxiliary wings are employed it is preferable, so to choose their fulcrums that if a wing is turned to increase the buoyancy, the air gap is narrowed, without, however, being completely closed when that wing has arrived in its end position, since that would means losing the favorable slot effect.

The novel construction of the supporting structure is advantageous also in so far as it facilitates the starting. Flying machines with simple rigid supporting planes when starting, i. e. at the running start are as a rule adjusted first to a reduced angle of inclination, and then, for the lifting, to an appropriately greater angle. The flying machine must, thus, be supported only in a transverse axis. Moreover, its tail must have an unfavorably high position in order to let it have the required freedom of oscillation.

These conditions which render difficult the manipulation and operation of the machine are obviated by the novel arrangement inasmuch as it is now possible by merely adjusting the auxiliary wings to increase the buoyancy of the supporting structure at the moment of starting to such a degree that the machine will rise without any necessity for the pilot to make the whole machine turn about a transverse axis. The flying machine may, thus, also at the start be supported on a plane, for instance with the aid of two axles which are arranged one behind the other in the direction of the starting run, and may lie the one far in front of, the other far behind, the centre of gravity whereby the stability of the flying machine is warranted and the dreaded tumbling over is prevented. The tail end need no more be positioned particularly high to secure a proper start. The body even if extending deeply downward at the point of largest section, may, thus, have a horizontal middle line extending in the direction of the propelling power.

When landing, a slow landing speed and safe touching of the ground may be attained in a corresponding manner solely by an appropriate adjustment of the auxiliary wings, without any necessity of letting the flying machine, as a whole, make comparatively extended turning movements about its transverse axis.

The novel construction thus permits of simplifying, and rendering secure, the starting, as well as the landing.

The fact that the necessity of turning the whole flying machine about a transversal axis is avoided is especially important for passenger flying machines, quite especially for the reason that such turning motions influence unfavorably the confidence of the passengers.

If necessary, the auxiliary wings may be adjusted also in such a manner that a deviation results. This is advantageous in the case where the flying machine must be left standing in the open for a comparatively long time, since then the wind will tend to press the machine down to the ground. Therefore, the dangers of lifting and of upsetting by the wind which normal flying machines are exposed to is considerably reduced.

The auxiliary wings may be utilized not only for the regulation of the buoyancy power of the flying machine, but also as horizontal and vertical rudders, and it is possible to so arrange them that the same portion of an auxiliary wing may be utilized as horizontal rudder and as vertical rudder. The arrangement may, for instance, be such that the auxiliary wing of a supporting structure extending across the whole width of the flying machine is divided into three portions, of which the middle one serves as vertical rudder, whereas the lateral portions may be used as horizontal rudders, independent of the middle one. Another possibility consists in subdividing the auxiliary wing only in two portions which are either moved oppositely to one another so as to serve as horizontal rudders, or in the same direction when they act as vertical rudders. In this latter case a steering gear is preferably employed having a member which may be moved either in different directions or in a different manner (rotation and displacement), its motion in the one direction or manner producing the one kind of motion of the two wing portions, and its motion in the other direction or manner producing the other kind of motion of said portions.

In the drawings affixed to this specification and forming part thereof several supporting structures embodying my invention are illustrated diagrammatically by way of example.

In the drawings Figs. 1, 2, 3, 4 and 12 show merely the supporting wings,

Figs. 8 and 10 showing the wings, as well as means for operating them,

Figs. 9 and 11 showing merely these operating means, and

Figs. 5, 6 and 7, showing the wings attached to a flying machine, as is more fully described hereinafter.

Referring first to Fig. 1 of the drawings, 1 is a main supporting wing of substantially normal configuration. To the rear of this wing there is rigidly disposed an auxiliary supporting wing 2, the upper side of which has approximately the same shape as its lower side. The rear edge 4 of the main wing 1 extends somewhat beyond or overlaps the front edge 5 of the auxiliary wing 2, whereby a passage or channel or slot 3 is formed between the two wings. The profiles of the two wings being formed after the manner of supporting planes and which form the upper and the lower wall of said channel or slot merge everywhere quite gradually into the other boundary surfaces of the wings, whereby the air current is conducted to the nozzle-like slot, as well as from this to the upper side of the auxiliary wing, without any eddies being formed. Experience has shown that the auxiliary wing 2 need have but the uniform shape with straight middle line, but if desired it may be shaped in conformity with supporting planes having a transverse middle line curved upwards.

In the second modification shown in Fig. 2 the main wing 1 is practically the same as that illustrated in Fig. 1, but the auxiliary wing 2′ is hinged at 6 to fin-like supporting arms 7. The positions of the hinges 6 at the auxiliary wing 2′ is such that this latter is supported near its buoyancy middle line and requires, therefore, but little power for varying its position. The position of the hinges 6 with respect to the main wing is, however, such that a sufficiently large free sectional area of the slot 3 is always provided irrespective of to which position the wing 2′ may have been adjusted.

In the modification disclosed in Fig. 3 the main wing 1 has practically the same shape as the corresponding wing in Figs. 1 or 2, but the supporting arms 7 project from its lower side and carry an auxiliary wing 2′ in hinges 6 located not upon the upper side of this wing, as in Fig. 2, but within its sectional area. To the rear and below the auxiliary wing 2′ there is arranged another auxiliary wing 2″ supported at 6′ by arms 7′ in just the same manner as the wing 2′ is carried by the wing 1.

The main wing 1 illustrated in Fig. 4 has a tail portion 9 hinged at 8 to the body of this wing; the auxiliary wing 2′ is similar to the one shown in Fig. 2, but the arms 7 are fixed to the body of the wing 1 in front of the joint 8. Owing to the movability of the tail portion 9 it is possible to adjust this latter with respect to the position the wing 2′ may have, in such a manner, that the most favorable width of the slot 3 is attained. Rods may be provided by aid of which the tail 9 and the wing 2′ may be simultaneously and positively adjusted. Instead of hinging a rigid tail, such as 9, to the body of the main wing, a fixed, but flexible tail may be provided.

Fig. 5 shows the wings of Fig. 2 attached to the body of a flying machine; besides, it shows that and how a flying machine body equipped with the novel combination of wings may be supported on the ground by front wheels 11 and rear wheels 12 which in contradistinction to the usual construction are spaced widely apart, whereby the machine is stably supported in longitudinal direction. Fig. 5 further shows that the tail of the comparatively low hull is located close to the ground. This is rendered possible by the adjustable auxiliary wings 2′ because the total buoyancy of the supporting structure 1, 2′ can be increased by an appropriate adjustment of the wing 2′, in a degree sufficient to lift the machine from the ground, without the necessity of enlarging the angle of inclination by turning down the tail portion.

The plan view illustrated in Fig. 6 shows that a main wing, such as 1, may be provided with a plurality of smaller auxiliary wings which allow of being singly turned. In this particular instance, a central auxiliary wing $2^b$ and two lateral auxiliary wings $2^a$, are provided, these latter being connected with one another by a steering gear (not shown) by aid of which they can be oscillated in opposite directions so as to be capable of serving as horizontal rudders. The effect produced with rudders constructed and arranged conformably with this invention is particularly vigorous and favorable for the steering inasmuch as owing to the slot or passage for the air provided at their front edges they render possible material variations of the buoyancy without excessive variations of the resistance to flight. The central auxiliary wing $2^b$, i. e. the vertical rudder, is, as such, connected with the steering gear. The wings $2^a$ and $2^b$ may be operated by a cannon lever or one of the well-known equivalent members by the actuation of which the wings $2^a$ are made to act as horizontal rudders and the wing $2^b$ is made to act as vertical rudder, but the respective steering device may also be so devised that the wings $2^a$ are oppositely moved so as to assist the wing $2^b$.

Fig. 7 shows a modification (drawn to a smaller scale) with merely two auxiliary wings $2^a$ extending from the middle outwards. These wings may be oscillated by different steering gears both at a time either in the same direction or in opposite directions. In the first case they operate as horizontal rudders, in the other case as vertical ones. The wings may either have a common steering gear or a separate steering lever may be provided for each of them.

A steering gear by the aid of which the wings may be actuated at a time, either in the same direction or in opposite directions, is illustrated, by way of example, in Figures 8 and 9. This steering gear consists of an axle or a shaft 17, a steering lever 19 hinged to it at the one end, two bell crank levers 16 hinged to the other end two rods 18 connecting the lever 19 with one arm of each lever 16, and two rods 15 connecting the other arms of the levers 16 with levers or crank arms 14 fixed to the hinge pins 6 of the wings 2ª. The levers 19 and 16 may be rocked forward and backward whereby the wings are oscillated in the same direction, but if the lever 19 is moved laterally in one or the other direction, the axle or shaft 17 is correspondingly turned, as is also the lever 15, whereby the rods 15 are moved in opposite direction so that the wings 2ª are also oscillated correspondingly. In the first case, therefore, the wings 2ª act as vertical rudders, in the second case as horizontal rudders.

The wings 2ª of the modification illustrated in Fig. 8 are supported from above in the manner shown in Fig. 5, but it is obvious that the same or equivalent or similar steering means may be employed also in connection with the examples shown in Figs. 2–4 or with any other modification embodying my invention. It is, furthermore, obvious that such and equivalent or similar steering means may be made use of also where there is a special central auxiliary wing, as in Figure 6.

Another steering gear is illustrated in Figs. 10 and 11, of which Fig. 10 is a side elevation and Fig. 11 a front elevation. The auxiliary wings are suspended similarly to the manner shown in Fig. 2, but the supporting arm 7 has a rearwardly and downwardly extending elongation 21 which serves as a support for a suspended rod 23 hinged at 22 to said extension 21 and carrying an upper sprocket wheel 27 and a lower sprocket wheel 25 connected with each other by a chain 26. The shaft of the lower chain wheel projects rearwards and has a hand wheel 24 secured to it. The upper chain wheel is connected with the wings 2ª by two connecting rods 29 attached to this wheel by ball-joints 28 and to the wings by ball-joints 30. The rod 23 can be rocked forward and backward whereby the wings 2ª are simultaneously oscillated in the same manner and act as vertical rudders. But if the hand wheel 24 is turned in the one or the other direction, this motion is transmitted to the wings by the mediation of the chain wheels 25 and 27, the chain 26 and the connecting rods 29, whereby the wings are oscillated in opposite directions and act as horizontal rudders.

In the modification shown in Fig. 12 the auxiliary wing 2′ which may act either like the wing 2ᵇ of Fig. 6 viz as vertical rudder, or like the wings 2ª of Figs. 6 and 7, viz as vertical and as horizontal rudder, has a horn 31 connected by a rod 32 to an arm 33 of a special vertical rudder 34 disposed at the tail end of the flying machine. By aid of the steering gear illustrated this rudder is caused to assume a substantially horizontal position wherever the wing 2′ is turned down in such a manner that the vertical steering effect is increased.

Besides the supporting structure, also the separate steering means may be designed to form a combination of surfaces such as or similar to, the novel supporting structure in order to increase the steering effect. In that case the damping surface takes the place of the main wing 1, and the rudder that of the auxiliary wing 2′. This is especially valuable in connection with mainly positively loaded vertical rudders such, for instance, as the vertical rudders of flying machines of the duck type which are arranged at the front of the machine, but also for vertical rudders arranged symmetrically with respect to the middle plane of the machine and at a comparatively great distance from this plane, and which are required to exert a steering effect only to one or the other side.

I wish it to be understood that I do not desire to be restricted to the details of construction shown and described, for obvious modifications will readily occur to a person skilled in the art.

I claim:—

1. Flying machine comprising a plurality of surfaces arranged one to the rear of and adjusted relatively to the other, the forward edge of the adjustable surface extending in close proximity to and below and in all relative positions of the parts somewhat forward of the rear edge of the surface arranged in front thereof, said adjustable surface being adapted to be oscillated as a whole about an axis extending transversely to the direction of propulsion in such a position, that, on the angle of inclination of the said adjustable surface being increased, the nozzle-like gap between the two surfaces becomes narrower.

2. Flying machine comprising a plurality of surfaces arranged one to the rear of and adjustable relatively to the other, the forward edge of the adjustable surface extending in close proximity to and below and in all relative positions of the parts somewhat forward of the rear edge of the surface arranged in front thereof, said adjustable surface being adapted to be oscillated as a whole about an axis extending transversely to the direction of propulsion in such a position, that, on the angle of inclination of the said adjustable surface being increased, the nozzle-like gap between the two surfaces become narrower, the axis of oscillation being so positioned with regard to the front surface that on the rear surface being inclined as far as admissible the gap will not be closed altogether.

In testimony whereof I affix my signature.

OTTO MADER.